US010615592B2

(12) United States Patent
Fotrousi

(10) Patent No.: US 10,615,592 B2
(45) Date of Patent: Apr. 7, 2020

(54) METHOD FOR REDUCING THE INRUSH CURRENT OF AN INDUCTIVE LOAD

(71) Applicant: INDRA SISTEMAS, S.A., Madrid (ES)

(72) Inventor: Farzad Fotrousi, Málaga (ES)

(73) Assignee: INDRA SISTEMAS, S.A., Alcobendas (ES)

( * ) Notice: Subject to any disclaimer, the term of this patent is extended or adjusted under 35 U.S.C. 154(b) by 333 days.

(21) Appl. No.: 15/318,107

(22) PCT Filed: Jun. 11, 2014

(86) PCT No.: PCT/ES2014/070482
§ 371 (c)(1),
(2) Date: Dec. 12, 2016

(87) PCT Pub. No.: WO2015/189437
PCT Pub. Date: Dec. 17, 2015

(65) Prior Publication Data
US 2017/0133838 A1    May 11, 2017

(51) Int. Cl.
*H02H 9/00* (2006.01)
*G05F 5/00* (2006.01)
*H02H 9/02* (2006.01)

(52) U.S. Cl.
CPC ............. *H02H 9/002* (2013.01); *G05F 5/00* (2013.01); *H02H 9/021* (2013.01)

(58) Field of Classification Search
CPC ........... H02H 9/002; H02H 9/021; G05F 5/00
See application file for complete search history.

(56) References Cited

U.S. PATENT DOCUMENTS

| | | | |
|---|---|---|---|
| 2,710,356 A * | 6/1955 | Laser .................. | B23K 9/1025 307/112 |
| 5,216,567 A | 6/1993 | Kontanzer | |
| 5,642,025 A * | 6/1997 | Konstanzer ............ | H02H 9/002 318/400.17 |
| 9,520,712 B2 * | 12/2016 | Cavallera ........... | G01R 33/0023 |

(Continued)

OTHER PUBLICATIONS

International Search Report, dated Sep. 24, 2014, priority document.

*Primary Examiner* — Thienvu V Tran
*Assistant Examiner* — Christopher J Clark
(74) *Attorney, Agent, or Firm* — Greer, Burns & Crain, Ltd.

(57) ABSTRACT

A method for reducing the inrush current of an inductive load, particularly a transformer, comprising the following steps: a) connecting a DC power source to the transformer for a time tc, to magnetize its magnetic core until saturation is reached, and connecting the transformer to the AC mains via an electromechanical switch, in an initially open position; b) disconnecting the transformer from the DC power source, the magnetic flux being reduced to its residual value; c) closing the electromechanical switch to complete the connection, this connection point being determined by the phase angle selected from the sinusoidal signal of the voltage power lines, in such a way that magnetic flux corresponding to the steady state voltage equals the residual magnetic flux that remains when the transformer is disconnected from the DC power source.

2 Claims, 7 Drawing Sheets

(56) References Cited

U.S. PATENT DOCUMENTS

2013/0175879 A1\* 7/2013 Taylor ................... H02H 9/002
  307/125
2014/0192443 A1\* 7/2014 Koshizuka ............ H02H 9/002
  361/35

\* cited by examiner

METHOD FOR REDUCING THE INRUSH CURRENT OF AN INDUCTIVE LOAD

FIELD OF THE INVENTION

The present invention relates to a method for reducing the inrush current of inductive loads, and is especially applicable to suppress inrush current when connecting transformers

BACKGROUND OF THE INVENTION

One of the usual problems when starting an electric machine is that the inrush current is much higher than the rated current, which can be harmful to the machine and to the mains or electrical power lines.

In the specific case of connection of transformers, when a transformer is powered on, transient currents can appear with values up to several times the transformer's rated current. The duration and intensity of this current is determined by constructive aspects of the transformer, the line resistance and mainly the residual flux of the transformer and the connection instant.

Depending on the instant the power supply is applied to the transformer, the magnetic flux wave can reach a peak value higher than twice its maximum value in normal operation conditions. This makes flux value exceed by far the "knee" of the magnetization hysteresis loop of the transformer.

The current in the primary winding required to produce that flux value can be up to several times the rated current of the transformer. This is the inrush current or starting current of the transformer.

The problems caused by these high current values on the physical structure of the transformer are well known, and go up to the point to decide not to deenergize the transformer to avoid the stress caused when it is energized again, which causes the situation that the transformer is permanently connected to the mains.

There are several technical solutions concerning methods to limit the inrush current appearing during the connection of a transformer to the mains by means of the premagnetization of the magnetic core of the primary winding of the transformer and the control of the phase angle of the mains voltage.

U.S. Pat. No. 5,216,567 A discloses a transformer inrush current limiting device in which there are certain magnetic conditions in the magnetic core of the primary winding and the phase angle of the mains voltage is controlled. This document provides a device of the above-mentioned type which without any design intervention of the power supply unit allows making the full power available, without noticeable retardation, after the cut-in of the power supply, and to suppress cut-in current peaks.

The solution consists of a capacitor on the one hand provided parallel to a transformer, and on the other hand arranged in series with an alternating current switch, a charging resistor and a rectifier. When a mains-off recognition circuit detects the incidental or intended shutoff of the mains, the alternating switch is fired and after several milliseconds the discharge of the capacitor towards the magnetic core of the transformer primary winding starts.

The discharge of the capacitor provides for certain known magnetization conditions of the magnetic core of the transformer primary winding, so the transformer can be connected to the mains at a preselectable phase angle between 90° and 0° before a zero passage of the mains voltage, i.e., between 90° and 180° in the positive or negative half cycle of the sinusoidal signal. In this way the cut-in current is limited to the charge current value before the zero passage of the mains voltage.

However, the device described in this document is connected to the primary winding by means of power electronics components which are unable of withstanding high voltages, which make them not applicable to high voltage. The cut-in current is limited but not suppressed and the premagnetization of the magnetic core of the transformer primary winding is made through the discharge of a capacitor.

U.S. Pat. No. 5,642,025 A discloses a process and an apparatus for the reduction of the inrush current of a three phase transformer connected to a rotary load in which there are certain magnetic conditions in each line of the magnetic core of the primary winding and the phase angle of the mains voltage is controlled. This document provides a process and an apparatus of the above-mentioned type by means of which a rotary load can be connected even in the case of variable charge conditions with a considerably reduced inrush current, preferably practically negligible.

The provided solution consists of creating a magnetization pattern in the lines of the magnetic core of the primary winding that allows to know the magnetic conditions of each line at each instant, so it can be connected at the right time, thus avoiding an excess inrush current.

The disclosed apparatus comprises servo components, connected to a control which contains a sequence control and a phase angle control, which can be controlled in such a manner that different current flow angles and switching sequences can be realized. The servo components are triacs, thyristors or a combination of electro-mechanical switches and semiconductor switches.

In the case of combination of electro-mechanical switches and semiconductor switches, when the transformer is fully connected to the mains, the semiconductor switches are bridged by mechanical contacts.

This document discloses the use of electro-mechanical switches in combination with semiconductor switches, the semiconductor switches being bridged when the transformer is fully connected to the mains. The semiconductor switches are unable to withstand high voltages so they cannot be applied in high voltage.

A drawback of the prior art systems is that they are not suitable for high voltage, as they are connected to the primary winding by means of a power electronics that does not withstand high voltages.

Accordingly, it would be desirable to obtain a process that limits or suppresses the inrush current during the load connection in high voltage.

SUMMARY OF THE INVENTION

The system of the present invention allows the achievement of the aforementioned objective and to solve the existing problems in the state of the art.

The invention provides a method for reducing the inrush current of an inductive load, particularly a transformer, comprising the following steps:

a) Connecting a DC power source to the transformer for a time tc, to magnetize its magnetic core until saturation is reached, and connecting the transformer to the AC mains by means of an electromechanical switch, in an initially open position.

b) Disconnecting the transformer from the DC power source (4), the magnetic flux being reduced to its residual value.

c) Closing the electromechanical switch to complete the connection, this connection point being determined by the phase angle selected from the sinusoidal signal of the voltage mains, in such a way that magnetic flux corresponding to the steady state voltage equals the residual magnetic flux that remains when the transformer is disconnected from the DC power source.

DETAILED DESCRIPTION OF THE PREFERRED EMBODIMENTS

References of the figures correspond to the following elements:

1.—One-phase power input.
2.—Measuring transformer.
3.—Control system for one-phase transformer.
4.—DC power supply.
5.—Phase Controller.
6.—Power switch.
7.—DC switching.
8.—One-phase transformer.
9.—Standard power circuit breaker.
10.—Two circuit power circuit breaker.
12.—Three-phase power input.
13.—Phase A power circuit breaker.
14.—Phase B power circuit breaker.
15.—Phase C power circuit breaker.
16.—Three-phase transformer with primary winding wye connected.
17.—Control system for three-phase transformer.
18.—Three-phase transformer with primary winding delta connected.

Figure 1:
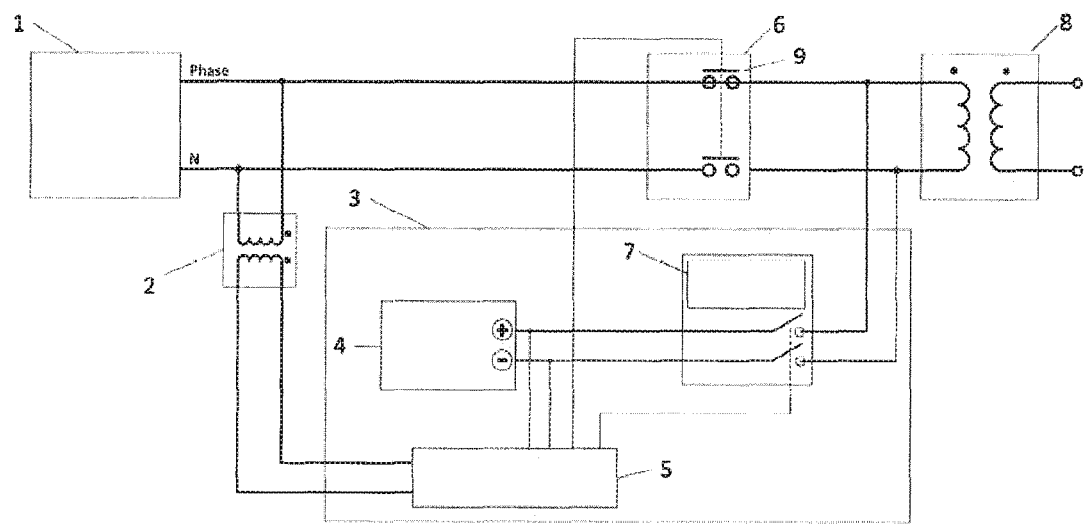
FIG. 1 shows a wiring diagram and the control system to power a single phase transformer suppressing the inrush current according to the invention.

FIG. 1 shows the wiring diagram and the control system to power a one-phase transformer 8 suppressing the inrush current Control system 3 requires having a sample of the input voltage, accessing to the activation solenoid of the circuit breaker 6 and a way to connect to the primary of the transformer 8 that is going to be energized.

To saturate the transformer core 8, it is required to energize it for a half-cycle of the maximum input voltage waveform. For a transformer designed to work with a sinusoidal signal type: $v(t)=\sqrt{2}Vef*\sin(wt)$ would be needed $\sqrt{2}$ Vef*T/$\pi$[Volt*Second], (result of integrating v(t) between 0 and T/2), where T represents the period of the signal. This amount would have to increase by about 20% since the transformers are usually designed for a maximum operating voltage about 20% above their nominal voltage.

The proposed control system 3, while keeping open the power circuit breaker 6, will apply a direct current to the transformer primary winding 8 for a time tC so that the required value of "Volts*Second" are delivered, i.e.: Vapplied*tC=1.2*$\sqrt{2}$Vef*T/$\pi$.

For example, for a transformer with a rated voltage of 230V at 50 Hz it would be necessary to apply a DC voltage of 2.48 V to get the core saturation in 1 second.

Thus, the saturation of the transformer core 8 is obtained. When then the DC pulse stops, the flux will drop to its positive remanence value.

Now, the AC voltage will be applied so that assure the continuity of flux, i.e., the AC voltage will be applied in the instant in which the flux corresponding to the steady state voltage, matches the residual flux value.

Figure 2:
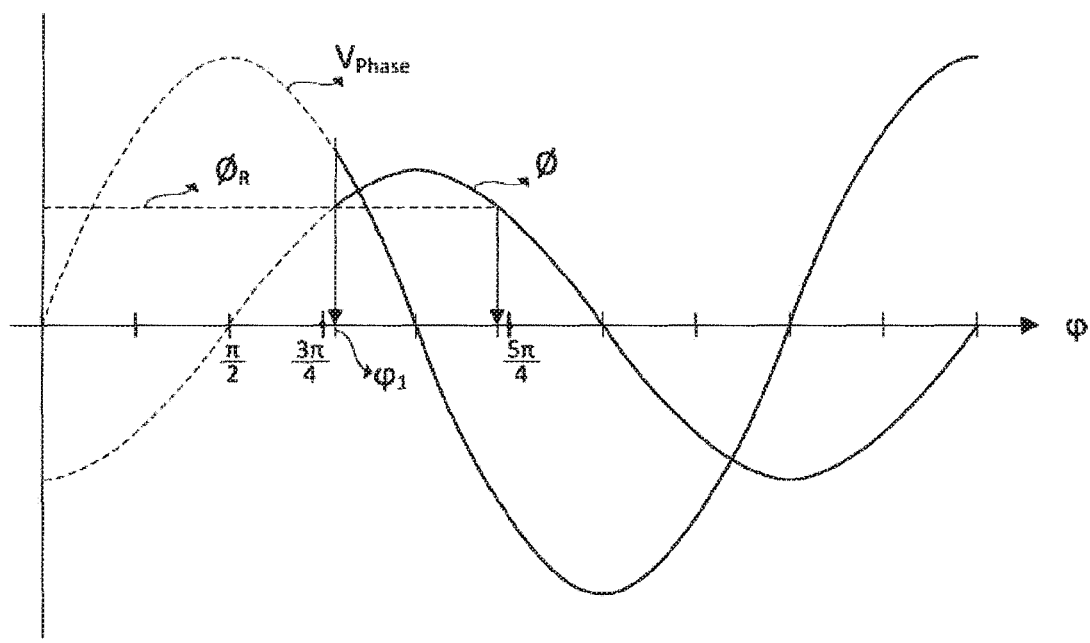
FIG. 2 shows a graph with the AC voltage supply of FIG. 1, the residual magnetic flux and the magnetic flux corresponding to the voltage, and power circuit breaker activation at $3\pi/4$.

Having applied the DC current to the primary winding 8 of the transformer as shown in FIG. 1, i.e., with positive connected to the line identified as "Phase" and negative connected to the line labeled "N" (Neutral), on each AC input voltage cycle, there will be two instants (see FIG. 2) in which the indicated continuity of flux is achieved. Those instants will be close to 3π/4 and 5π/4 radians after the zero crossing on the rising edge of the input phase voltage. Closing the power circuit breaker in any of these points, optimally will be reduced the inrush current, getting even to its suppression.

For each transformer model has to be found, in practice, the optimum activation instant. Using directly any of the indicated phase values: 3π/4 or 5π/4, in any case, a significant reduction of the inrush current will be obtained.

The activation delay of the power circuit breaker 6 to activate its solenoid with the necessary advance must be known, so that the closure occurs at the appropriate time.

Figure 3:
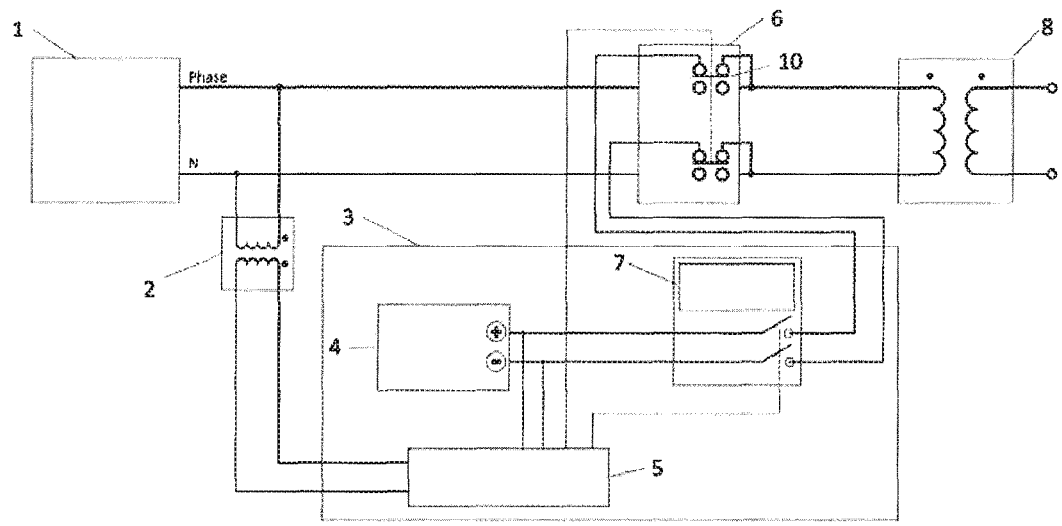
FIG. 3 shows an alternative wiring diagram and the control system to power a single phase transformer suppressing the inrush current according to the invention.

FIG. 3 shows an alternative option to FIG. 1 configuration in which, using a two circuit power circuit breaker 10, it is mechanically assured that the line voltage is not present in the control system 3 when the transformer is powered.

Figure 4:
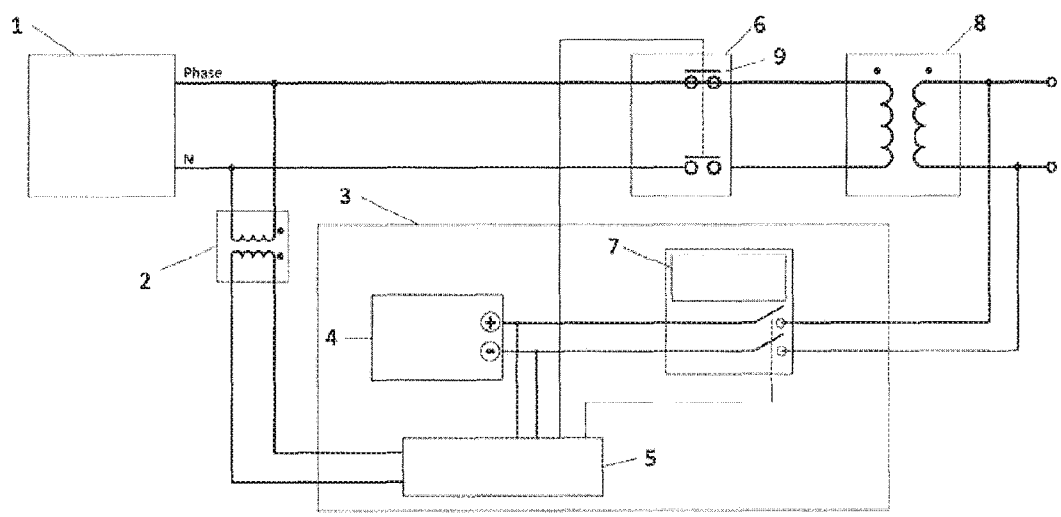
FIG. 4 shows another alternative wiring diagram and the control system to power a single phase transformer suppressing the inrush current according to the invention.

Another alternative option shown in FIG. 4 is to make the connection to apply DC saturating current through the secondary winding of the transformer 8, instead of using the primary winding As regards its implementation in three-phase transformers, it should be differentiated between three-phase transformers with primary winding wye connected and three-phase transformers with primary winding delta connected.

Figure 5:
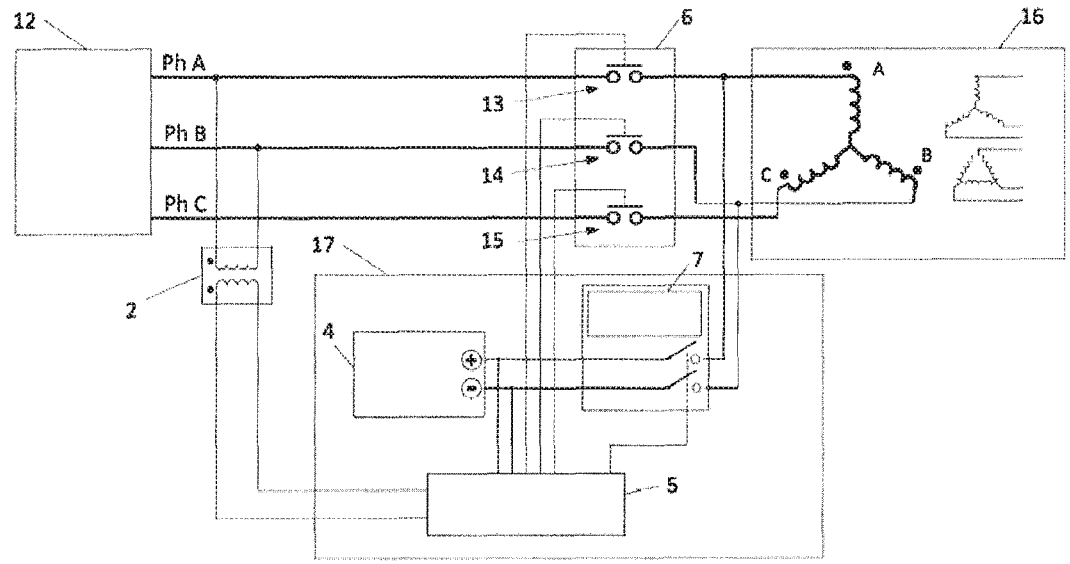
FIG. 5 shows a wiring diagram and the control system to power a three-phase transformer with the primary winding wye connected suppressing the inrush current according to the invention.

FIG. 5 shows the wiring diagram and the control system to reduce inrush current when powering up a three-phase transformer 16 with its primary windings wye connected.

The control system 17 for a three☐phase transformer 16 requires having a sample of the input voltage between two phases (A and B for example) assuming an A-B-C phase rotation. It also requires access to the three activation solenoids of the three control relays 13, 14, 15 of the circuit breaker and a way to connect to the primary of the transformer 16 that is going to be energized.

The proposed control system 17, by keeping open the three circuit breakers 13, 14, 15, will apply a direct current between phases A and B of the transformer primary winding, with value IK for a time tC, as described for the single-phase transformer 8.

This produces a saturation flux in columns of the A and B windings of the transformer core 16.

Figure 6:
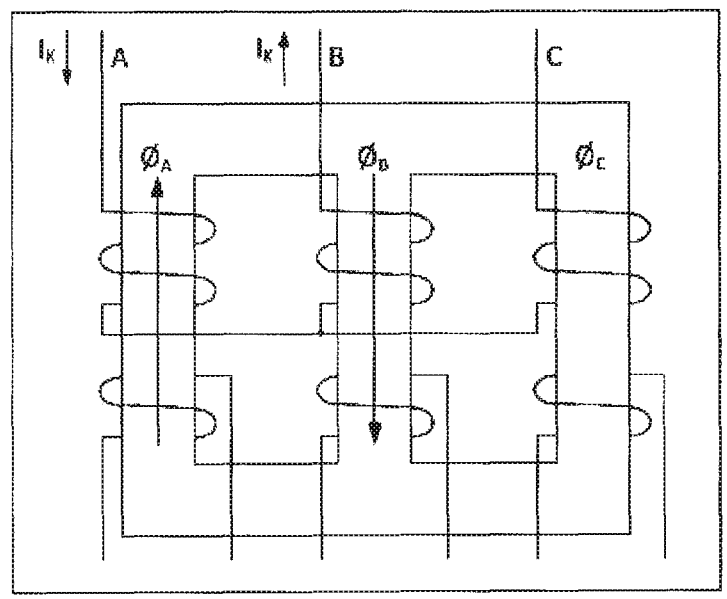
FIG. 6 shows the magnetic fields in the wye three-phase transformer.

FIG. 6 shows this IK value currents and the magnetic fluxes in the three-phase wye connected transformer 16.

The control circuit 17 applies a DC current between phases A and B while keeping disconnected the phase winding C. The currents IA and IB will be equal (with value IK) and opposite in direction. Therefore: ØA=ØB and ØC=0. When then the DC pulse stops, the flux will drop to its residual or remanence value.

After stopping the DC pulse, the AC voltage will be applied so that the continuity of flux is assured, i.e., the AC voltage will be applied in the instant in which the flux corresponding to the steady state voltage, matches the residual flux value.

Figure 7:
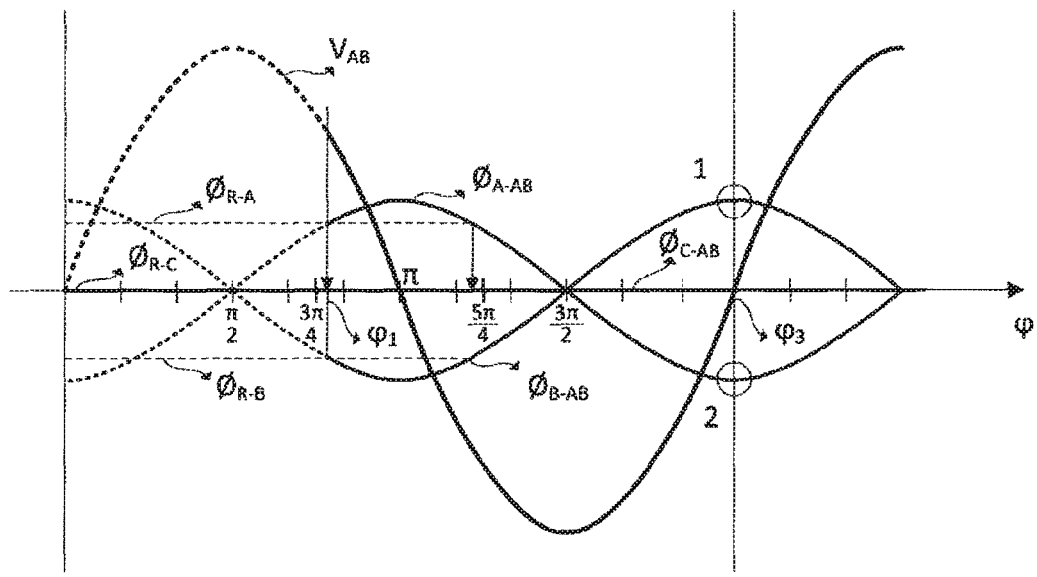
FIG. 7 shows a graph diagram with the AC voltage between FIGS. 5 A and B phases (VAB), the residual magnetic field, the magnetic field in column A caused by VAB voltage, the magnetic field in column B caused by VAB voltage, the magnetic flux in column C caused by VAB voltage, and the A phase and B phase power circuit breakers activation at $3\pi/4$.

FIG. 7 shows the voltage between phases A and B (VAB=VA☐VB) and the flux in columns A, B and C when only VAB voltage is applied, i.e., before applying the phase voltage VC are represented as: ØA-AB the flux in column A caused by VAB voltage, ØB☐AB flux in column B caused by VAB voltage and ØC☐AB flux in column C caused by the same voltage VAB. This last flux is zero.

This figure also shows the residual flux in columns A, B and C, identified as ØR-A, ØR-B y ØR-C.

Having applied the DC voltage between phases A and B of the transformer 16 primary windings as shown in FIG. 5, i.e., positive connected to the line identified as "A" phase and negative connected to the line identified as "B" phase, on each cycle of the voltage between phases VA☐VB there will be two instants at which the ØA☐AB flux for steady state intersects the line representing the residual flux ØR☐A. One of these instants (φ1) will be located around the phase shift value φ=3π/4 and the other one (φ2) around the phase shift value φ=5π/4. The same description is applicable to the ØB☐AB flux and the residual flux ØR☐B. If the voltage between phases VAB is applied in any of these points, there will not be discontinuity of flux and therefore there will not be an inrush current.

Figure 8:
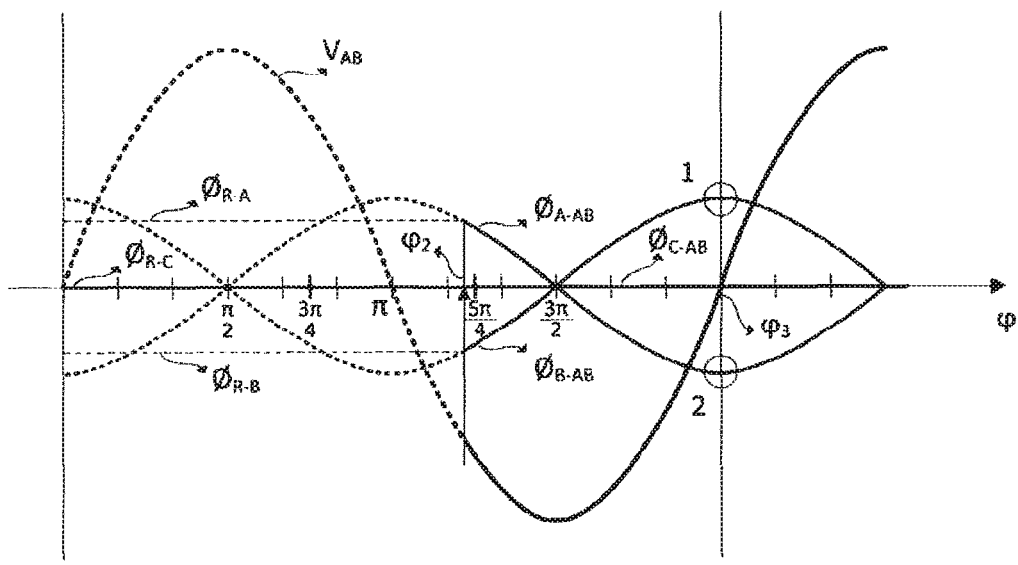
FIG. 8 shows a graph with FIG. 5 AC voltage between A and B phases (VAB), the residual magnetic flux, the magnetic flux in column A caused by VAB voltage, the magnetic field in column B caused by VAB voltage, the magnetic flux in column C caused by VAB voltage, and the A phase and B phase power circuit breakers activation at $5\pi/4$.

FIG. 8 shows the activation of the voltage between phases VAB in the instant corresponding to the phase shift φ2.

To complete the powering of the three-phase power transformer 16 wye connected, is required activate the C phase voltage, by closing the circuit breaker 15 of this phase, without flux discontinuity in the transformer 16 core.

Figure 9:
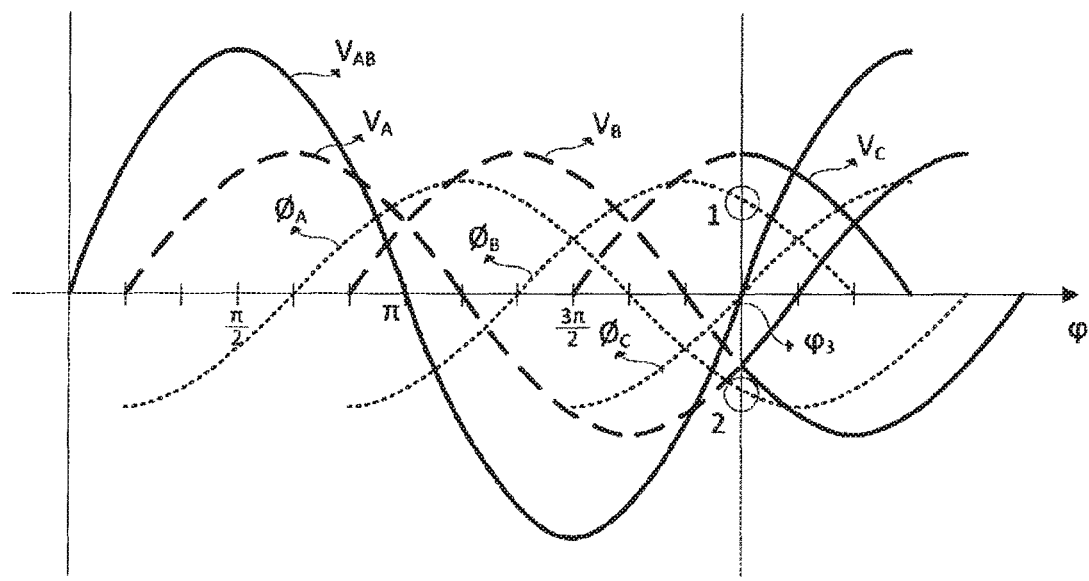
FIG. 9 shows VA, VB y VC voltages of the balanced three-phase voltage system and the VAB voltage. This figure also represents the fluxes ØA, ØB and ØC corresponding to each one of the phase voltages, and the C phase power circuit breaker activation is indicated.

FIG. 9 shows the voltage between phases VAB applied so far to the transformer and the phase voltages VA VB and VC of the balanced three phase voltage system. This figure also represents the fluxes ØA, ØB and ØC corresponding to each one of the phase voltages.

The voltage VC is applied at the instant corresponding to the phase value φ3 shown in FIG. 9. This phase value corresponds to a zero crossing rising edge of voltage VAB.

To prevent flux discontinuity, at the elected instant of VC voltage activation the flux values in the three transformer columns before VC voltage activation must match the corresponding flux values in steady state after VC activation. That is, the flux values in columns A and B at φ3 instant in FIG. 8 should match the flux values in columns A and B at φ3 in FIG. 9. And the flux in column C should remain zero.

By activating the VC voltage (in φ3) the three phase transformer 16 will get the voltages and fluxes shown in FIG. 9.

Before applying the VC voltage, the voltage amplitude in the column A winding is a half of the voltage between phases VAB and follows the same phase angle. After applying VC, the voltage across winding of column A increases its amplitude by a factor $2/\sqrt{3}$ and a phase lag value of π/6.

Flux in column A follows the same changes as the voltage, in point 2 of FIG. 8, before applying VC voltage, the flux value is ØA-AB=-|ØA-AB|. In point 2 of FIG. 9, after applying VC voltage, the flux in column A (ØA) increases amplitude by a $2/\sqrt{3}$ factor and a phase lag value of π/6 with respect to ØA-AB, taking the value:

$$ØA = 2/\sqrt{3}*(-|ØA-AB|)*\cos(-\pi/6) =$$

$$= 2/\sqrt{3}*(-|ØA-AB|)*\sqrt{3}/2 = -|ØA-AB|.$$

The same value as the flux before applying VC voltage.

The same occurs at point 1 with respect to ØB-AB and ØB. In this case ØB is ahead π/6 about ØB-AB.

Finally, φ3 corresponds to an instant at which the phase voltage VC in steady state passes through a maximum, so in φ3 the flux in column of winding C will be null, and will mate with the flux value in that column before that instant.

Thus the flux values before and after φ3 will mate. Applying the phase voltage VC in φ3 there will not be flux discontinuity in the core of the transformer 16, eliminating the inrush current.

As we have seen, applying the phase voltages VA, VB and VC at the points indicated optimally reduces the starting current of a three phase transformer 16 with the primary windings wye connected, even going up to its annulment.

For each transformer model, needs to be found, in practice, the optimum activation instant, however, using the values of phase shift: $\varphi 1=3\pi/4$ ό $\varphi 2=5\pi/4$ for VA−VB voltage, and applying VC in $\varphi 3$ is obtained, in any case, a significant reduction of the starting current.

Figure 10:
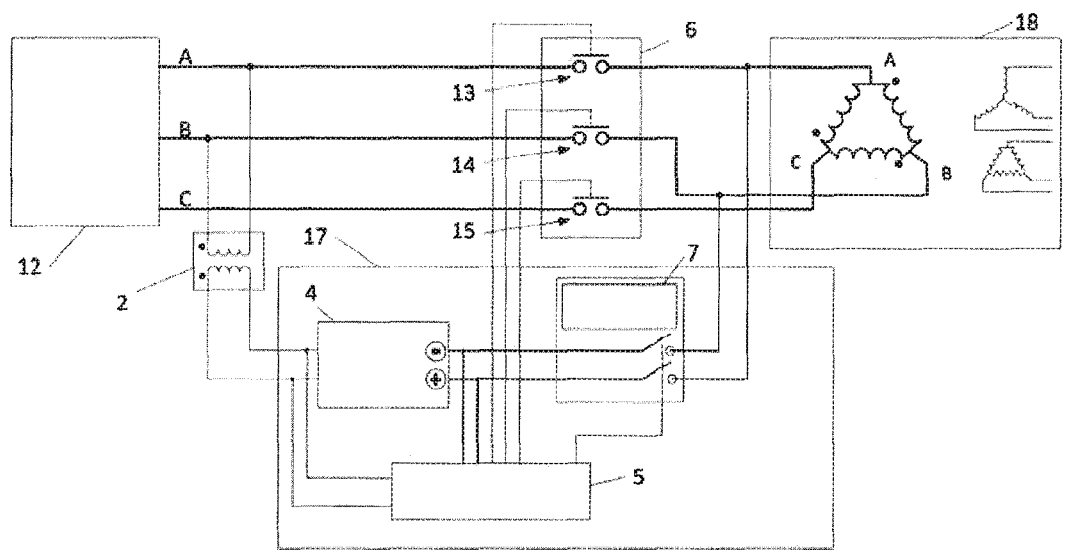
FIG. 10 shows a wiring diagram and the control system to power a three phase transformer with its primary windings delta connected suppressing the inrush current according to the invention.

FIG. 10 shows the wiring diagram and the control system to reduce inrush current when powering up a three-phase transformer 18 with its primary windings delta connected.

As for wye connected three-phase transformers 16, the control system 17 for a three-phase transformer delta connected requires having a sample of the input voltage between two phases, access to the activation solenoids of the three control relays of the circuit breakers 13, 14, 15 and a way to connect to the primary of the transformer 18 that is going to be energized.

The proposed control system 17, by keeping open the three circuit breakers 13, 14, 15, will apply a direct current pulse between phases A and B of the transformer primary winding 18, with value IK for a time tC, as described for the single-phase transformer 8. The phase C is maintained disconnected.

Figure 11:
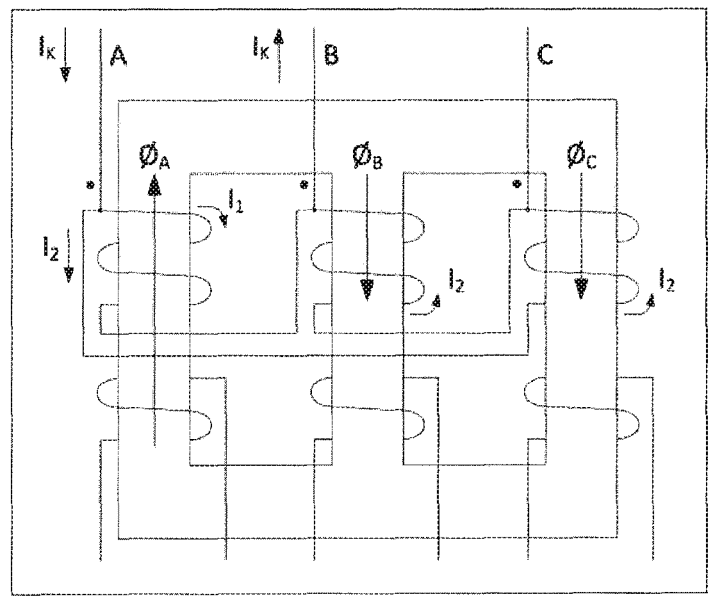
FIG. 11 shows the magnetic fluxes in the three phase delta connected transformer.

In this case, the current IK will circulate through windings A, B and C as shown in FIG. 11, being I1 the current circulating through the winding A, and I2 the current in the windings B and C.

Assuming the three windings have a similar impedance, is satisfied that I1=2*I2 and the flux ØA and flux created in column A (ØA) will be approximately double that ØB and ØC value. When the DC pulse stops, the flux in the transformer 18 core is reduced to its residual value.

After the DC is stopped, the AC voltage will be applied so that the continuity of flux is assured, i.e., the AC voltage will be applied in the instant in which the flux corresponding to the steady state voltage, matches the residual flux value.

Figure 12:
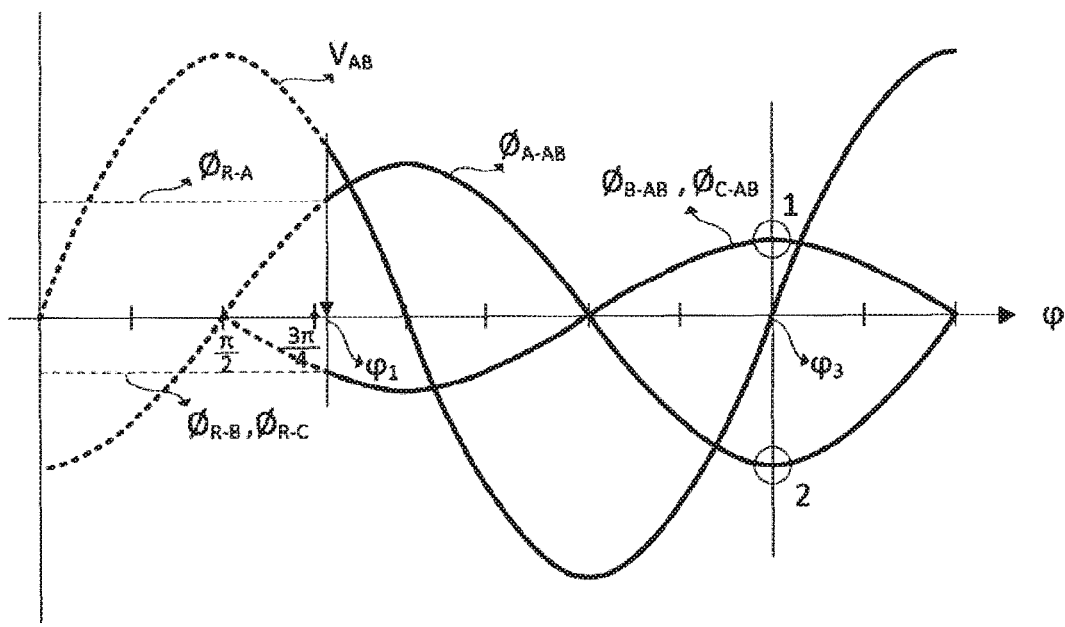
FIG. 12 shows a graph with FIG. 10 AC voltage between A and B phases (VAB), the residual magnetic flux, the magnetic flux in column A caused by VAB voltage, the magnetic field in column B caused by VAB voltage, the magnetic flux in column C caused by VAB voltage, and the A phase and B phase power circuit breakers activation at $3\pi/4$.

FIG. 12 shows the voltage between phases A and B (VAB=VA−VB) and the flux in columns A, B and C when only VAB voltage is applied, i.e., before applying the phase voltage VC. The flux in column A caused by VAB voltage is represented as: ØA−AB, flux in column B equals the flux in column C and are represented as ØB−AB y ØC−AB. This figure also shows the residual flux in columns A, B and C, identified as ØR−A, ØR−B y ØR−C.

Figure 13:
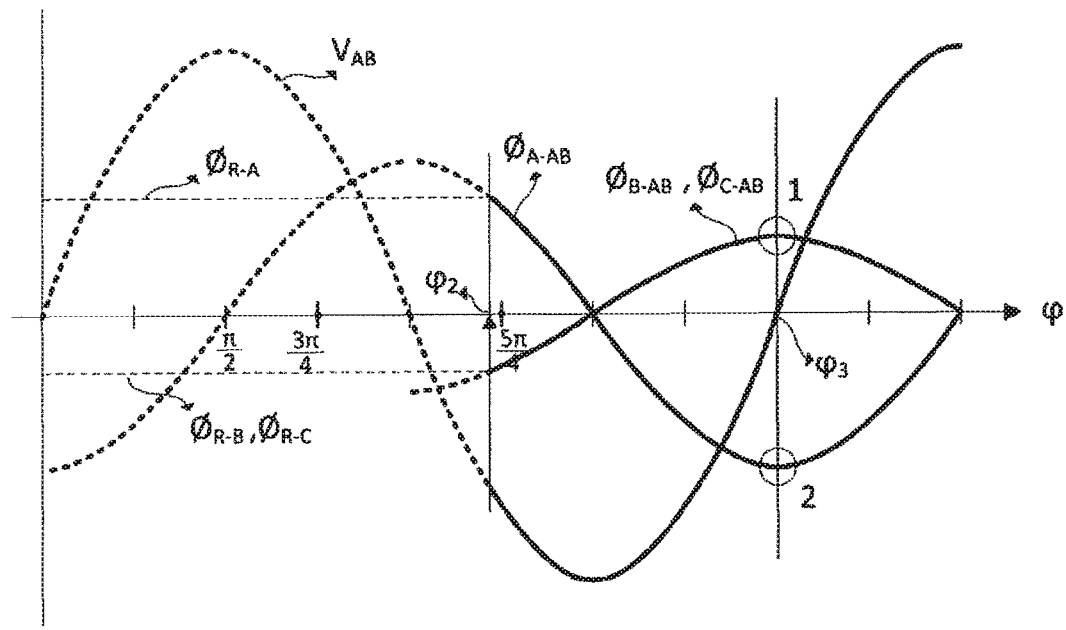
FIG. 13 shows a graph with FIG. 10 AC voltage between A and B phases (VAB), the residual magnetic flux, the magnetic flux in column A caused by VAB voltage, the magnetic field in column B caused by VAB voltage, the magnetic flux in column C caused by VAB voltage, and the A phase and B phase power circuit breakers activation at $5\pi/4$.

Having applied the DC voltage between phases A and B of the transformer 18 primary windings as shown in FIG. 10, i.e., positive connected to the line identified as "A" phase and negative connected to the line identified as "B" phase, on each cycle of the voltage between phases VA−VB there will be two instants at which the ØA−AB flux for steady state intersects the line representing the residual flux ØR−A. One of these instants ($\varphi 1$) will be located around the phase shift value $\varphi=3\pi/4$ (FIG. 12) and the other one ($\varphi 2$) around the phase shift value $\varphi=5\pi/4$ (FIG. 13). If the voltage between phases VAB is applied in any of these points, there will not be discontinuity of flux and therefore there will not be inrush current.

FIG. 13 shows the activation of the voltage between phases VAB activating the power circuit breakers 13, 14 of phases A and B at $\varphi 2$.

From the moment that the phase voltage VAB is applied, the flux through the column of the winding A also goes through columns B and C in the opposite direction and being |ØB−AB|=|ØC−AB|=½|ØA−AB|.

Figure 14:
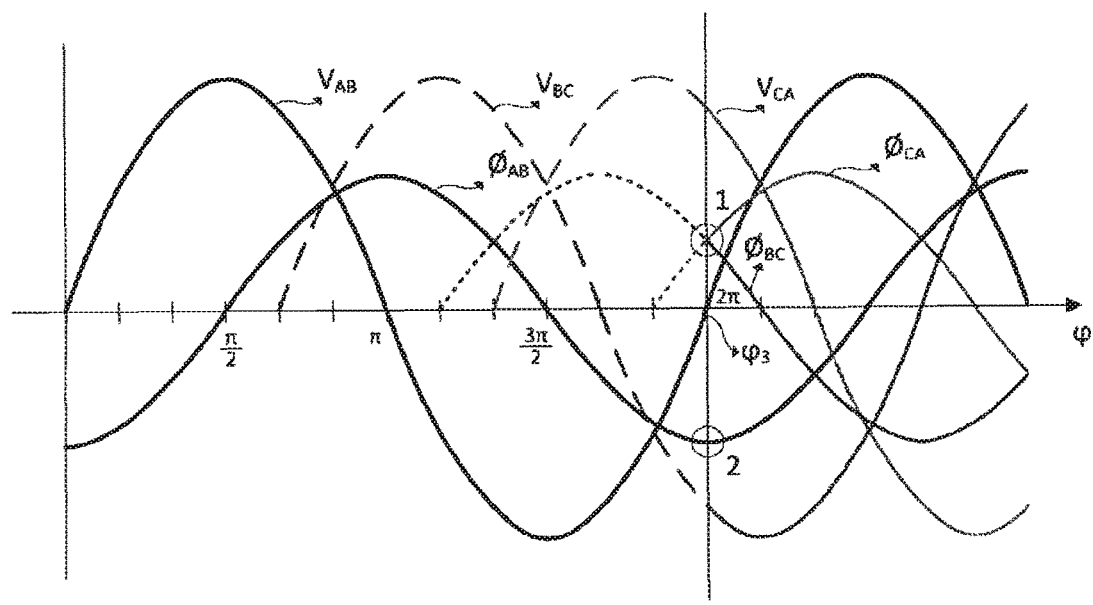
FIG. 14 shows VAB voltage, and VBC and VCA voltages that appear in FIG. 10 transformer when C phase power circuit breaker is activated. Magnetic fluxes ØAB, ØBC and ØCA corresponding to voltages between phases are also represented.

When the C-phase circuit breaker 15 is closed, appear in the transformer 18 the voltages between phases VBC and VCA, and the fluxes ØBC and ØCA respectively, as shown in FIG. 14. For delta connected three-phase transformer 18, closing the C-phase circuit breaker 15 produces no change in the voltage applied to the winding of column A.

In particular, by closing the C-phase circuit breaker 15 at a zero crossing rising edge of the voltage between phases VAB ($\varphi 3$ in the figures) the flux in the column of A winding does not change (because the voltage in this winding does not change) so that the flux ØA−AB before applying VC (point 2 in FIG. 12 and FIG. 13) will match with the steady state flux ØAB after VC application (point 2 in FIG. 14).

Furthermore, in steady state, the zero crossings of the voltage between phases VAB correspond to maximum or minimum for ØAB flux and therefore to instants in which ØBC and ØCA are equal, have a value of ½ ØAB and opposite direction to ØAB.

In $\varphi 3$, flux ØB−AB and ØC−AB in columns B and C before closing the C-phase circuit breaker 15 (with value ½ØA−AB and opposite direction to ØA−AB) identified with point 1 in FIG. 12 and FIG. 13, will also be the same as for the steady state at that point (ØBC and ØCA in point 1 of FIG. 14), thereby achieving continuity of flux and thereby suppressing the inrush current.

It is important to note that the method of the invention uses only electromechanical switches, and not power electronics components, which allow that they withstand the connection to high voltage mains. Also with this method the problem of the inrush current and its peaks can be completely solved.

Although the present invention has been fully described in connection with preferred embodiments, it is evident that modifications may be introduced within the scope thereof, not considering this as limited by these embodiments, but by the contents of the following claims.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method for reducing or suppressing the inrush current of an inductive load of a three-phase transformer with primary windings wye connected, when it is connected to three-phase AC power lines by means of electromechanical switches, comprising:
   a) connecting a DC power source to the primary windings of the three-phase transformer, applying a direct current with value IK between two phases of the primary winding of the three-phase transformer, the other phase being disconnected, for a time tc, necessary to magnetize its magnetic core until saturation is reached;
   b) after time tc, disconnecting the DC power source from the three-phase transformer, the magnetic flux being reduced to its residual value;
   c) connecting the three-phase transformer to the AC power lines by applying a voltage VAB between the said two phases by activating the corresponding electromechanical switches of said two phases and later applying a phase voltage VC by closing the electromechanical switch of said other phase;
   wherein the application of the voltage between phases VAB is done in an instant close to one of $3\pi/4$ or $5\pi/4$ radians after a positive going zero crossing of the voltage VAB, and the later application of the phase voltage VC takes place in an instant corresponding to a zero crossing on a rising edge of the voltage VAB.

2. A method for reducing or suppressing the inrush current of an inductive load for a three-phase transformer with primary windings delta connected, when it is connected to three-phase AC power lines via electromechanical switches, comprising the following steps:

a) connecting a DC power source to the primary windings of the three-phase transformer, applying a direct current with value IK between two phases of a primary winding of the three-phase transformer, the other phase being disconnected, for a time tc, necessary to magnetize a magnetic core of the transformer until saturation is reached;

b) after time tc, disconnecting the DC power source from the three-phase transformer, the magnetic flux being reduced to its residual value;

c) connecting the three-phase transformer to the AC power lines by applying a voltage VAB between the said two phases by activating the corresponding electromechanical switches of said two phases and later applying a phase voltage VC by closing the electromechanical switch of said other phase;

wherein the application of the voltage between phases VAB is done in an instant close to one of $3\pi/4$ or $5\pi/4$ radians after a positive going zero crossing of the voltage VAB, and the later application of the phase voltage VC takes place in an instant corresponding to a zero crossing on a rising edge of the voltage VAB.

* * * * *